Patented June 8, 1937

2,083,018

UNITED STATES PATENT OFFICE 2,083,018

QUINONE AZO-DYESTUFFS SOLUBLE IN WATER AND A PROCESS OF PREPARING THEM

Fritz Hess and Karl Hager, Frankfort-on-the-Main-Hochst, and Werner Asch, Frankfort-on-the-Main-Sindlingen, Germany, assignors to General Aniline Works, Inc., New York, N. Y., a corporation of Delaware No Drawing. Application December 23, 1935, Serial No. 55,934. In Germany December 29, 1934

8 Claims. (Cl. 260—56.5)

The present invention relates to quinone azo-dyestuffs soluble in water and to a process of preparing them, more particularly to the dyestuffs soluble in water corresponding to the following general formula

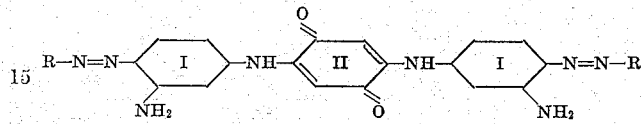

wherein the R's stand for radicals of the benzene series containing at least one sulfonic acid group, the nuclei signified by I may be further substituted by methyl or sulfonic acid groups and the nucleus signified by II may be substituted by chlorine or methyl groups.

We have found that valuable dyestuffs soluble in water are obtainable by combining with a benzoquinone either by oxidation or condensation a diaminoazo-dyestuff obtainable by coupling the diazo-compound of an aminoaryl-mono-sulfonic acid or an aminoaryl-poly-sulfonic acid with meta-phenylene-diamine or a substitution product thereof.

The brown dyestuffs thus obtained are distinguished by good properties of fastness and are especially adapted for dyeing leather, since they have the valuable property of penetrating deeply into the leather during the dyeing process, and of dyeing in many cases even the whole core of the leather.

The following examples serve to illustrate the invention, but they are not intended to limit it thereto, the parts being by weight:

(1) 30 parts of the diaminoazo-dyestuff, obtainable from diazotized sulfanilic acid and meta-phenylenediamine, are dissolved in 500 parts of water with addition of 30 parts of calcined sodium carbonate. 13 parts of chloranil are added to the yellow-red solution of the dyestuff, and the mixture is then boiled, while stirring, for 20 hours in a reflux apparatus. It is filtered, while hot, the filtrate is precipitated by means of 60 parts of crude hydrochloric acid, the precipitate is filtered with suction and the filter cake is rendered alkaline by means of a sodium carbonate solution of 10 per cent. strength. After evaporation, 32 parts of a dyestuff are obtained which penetrates deeply into the leather and yields deep-brown tints. The dyestuff corresponds with the following probable formula:

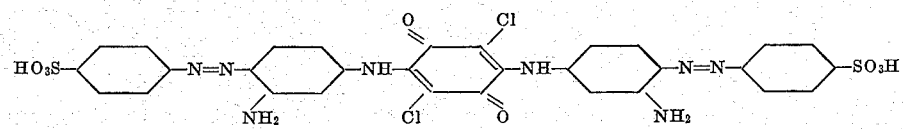

A dyestuff of similar properties is obtained by using instead of the sulfanilic acid 1-amino-2-hydroxybenzene-5-sulfonic acid as diazo-component for the manufacture of the diaminoazo-dyestuff.

(2) 32 parts of the diaminoazo-dyestuff, obtainable from diazotized ortho-aminophenolsulfonic acid and meta-phenylenediamine, are dissolved in 500 parts of water with addition of 30 parts of calcined sodium carbonate. While well stirring, 17 parts of toluquinone in the form of a paste and 10 parts of pyrolusite of 86 per cent. strength are added. The whole is boiled for 24 hours under reflux, filtered while hot, the dyestuff is precipitated from the filtrate by addition of 60 parts of crude hydrochloric acid and the brown precipitate is filtered with suction. The filter cake is rendered alkaline by means of ammonia. After drying, 38 parts of a brown powder are obtained; the dyestuff penetrates deeply into the leather and yields dark brown tints.

By substituting in the preceding example for the toluquinone benzoquinone or 2.5-xyloquinone, dyestuffs of similar properties are obtained.

In an analogous manner brown dyestuffs adapted for dyeing leather are obtained by using for the preparation of the diaminoazo-dyestuffs other aminoaryl-mono- or poly-sulfonic acids as diazo-components, for instance, metanilic acid, 1-amino-2-methylbenzene-4-sulfonic acid, 1-amino-2-methylbenzene-5-sulfonic acid, 1-amino-4-methylbenzene-2-sulfonic acid, 1-amino-2.4-dimethylbenzene-6-sulfonic acid, 1-amino-2-chlorobenzene-4-sulfonic acid, 1-amino-2-chlorobenzene-5-sulfonic acid, 1-amino-2.4-dichlorobenzene-6-sulfonic acid, 1-amino-2.5-dichlorobenzene-4-sulfonic acid, 1-amino-3-nitrobenzene-4-sulfonic acid, 1-amino-4-nitrobenzene-2-sulfonic acid, 1-amino-2-nitrobenzene-4-sulfonic acid, 1-amino-2-methoxybenzene-4-sulfonic acid, 1-aminobenzene-2.4-disulfonic acid, 1-aminobenzene-2.5-disulfonic acid or aminobenzene-trisulfonic acids, and instead of meta-phenylenediamine its substitution products as, for instance, 1.2.4-toluylenediamine, 1.2.6-toluylenediamine, meta-phenylenediamine-sulfonic acid or toluylenediamine-sulfonic acid.

We claim:

1. A process of preparing dyestuffs soluble in water which comprises combining with a benzoquinone a diaminoazo dyestuff obtainable by coupling the diazo-compound of an aminobenzene containing at least one sulfonic acid group with a meta-phenylenediamine compound.

2. A process of preparing a dyestuff soluble in water which comprises combining by oxidation

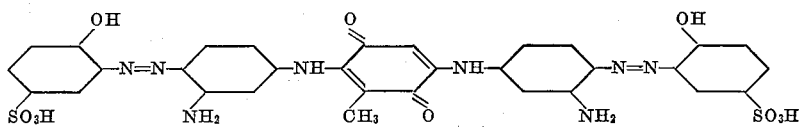

with toluquinone the diaminoazo-dyestuff obtainable by coupling the diazo-compound of ortho-aminophenolsulfonic acid with meta-phenylenediamine.

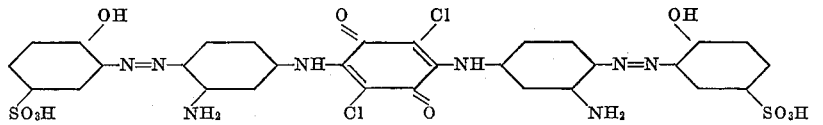

3. A process of preparing a dyestuff soluble in water which comprises combining by condensation with chloranil the diaminoazo-dyestuff obtainable by coupling the diazo-compound of

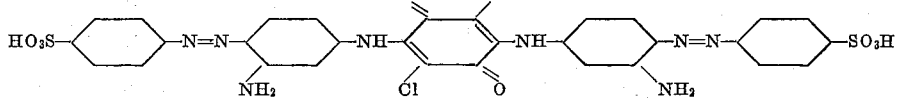

ortho - aminophenolsulfonic acid with meta-phenylenediamine.

4. A process of preparing a dyestuff soluble in water which comprises combining by condensation with chloranil the diaminoazo-dyestuff obtainable by coupling the diazo-compound of sulfanilic acid with meta-phenylenediamine.

5. The dyestuffs soluble in water corresponding to the following general formula

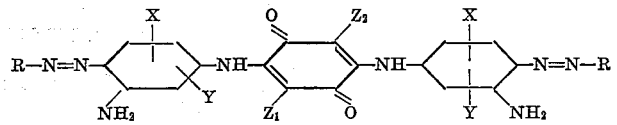

wherein the R's stand for radicals of the benzene series containing at least one sulfonic acid group, the X's stand for members of the group consisting of hydrogen, methyl and sulfonic acid groups, the Y's for members of the group consisting of hydrogen and methyl and $Z_1$ and $Z_2$ stand for members of the group consisting of hydrogen, methyl and chlorine, being brown powders which dye leather deep-brown tints of good fastness properties.

6. The dyestuff soluble in water corresponding to the following formula being a brown powder, penetrating deeply into the leather and yielding dark brown tints.

7. The dyestuff soluble in water corresponding to the following formula being a brown powder, penetrating deeply into the leather and yielding dark brown tints.

8. The dyestuff soluble in water corresponding to the following formula being a brown powder, penetrating deeply into the leather and yielding deep-brown tints.

FRITZ HESS.
KARL HAGER.
WERNER ASCH.